US012674719B2

(12) United States Patent
Wang et al.

(10) Patent No.: US 12,674,719 B2
(45) Date of Patent: Jul. 7, 2026

(54) SYSTEM FOR MEASURING ROUGHNESS OF CORE SIDEWALL OF OPTICAL WAVEGUIDE BASED ON MODE EXCITATION

(71) Applicant: Shanghai University, Shanghai (CN)

(72) Inventors: Tingyun Wang, Shanghai (CN); Chuanlu Deng, Shanghai (CN); Yi Huang, Shanghai (CN); Xiaobei Zhang, Shanghai (CN); Qi Zhang, Shanghai (CN)

(73) Assignee: Shanghai University, Shanghai (CN)

( * ) Notice: Subject to any disclaimer, the term of this patent is extended or adjusted under 35 U.S.C. 154(b) by 106 days.

(21) Appl. No.: 18/804,743

(22) Filed: Aug. 14, 2024

(65) Prior Publication Data

US 2025/0334482 A1 Oct. 30, 2025

(30) Foreign Application Priority Data

Apr. 30, 2024 (CN) .......................... 202410545698.9

(51) Int. Cl.
*G01M 11/00* (2006.01)

(52) U.S. Cl.
CPC .... *G01M 11/3154* (2013.01); *G01M 11/3145* (2013.01)

(58) Field of Classification Search
CPC ......... G01M 11/3154; G01M 11/3145; G01M 11/33; G01B 11/30; G01B 11/303
See application file for complete search history.

(56) References Cited

U.S. PATENT DOCUMENTS

| | | | | |
|---|---|---|---|---|
| 7,340,119 B1 * | 3/2008 | Xu | ..................... | G02B 6/02104 385/12 |
| 9,366,809 B1 * | 6/2016 | Bock | .................. | G01N 21/4133 |
| 11,445,937 B2 * | 9/2022 | Liu | .......................... | G01K 7/02 |
| 2003/0072005 A1 * | 4/2003 | Tsao | ................... | G01K 11/3206 374/E11.016 |
| 2005/0002606 A1 * | 1/2005 | James | ................... | G02F 1/0118 385/37 |
| 2006/0126991 A1 * | 6/2006 | Huang | ................... | B82Y 35/00 356/482 |
| 2009/0059211 A1 * | 3/2009 | Park | ..................... | G01N 21/553 356/133 |
| 2010/0322559 A1 * | 12/2010 | Ogawa | ............... | G02B 6/29325 703/2 |

(Continued)

*Primary Examiner* — Sang H Nguyen
(74) *Attorney, Agent, or Firm* — Welsh Flaxman & Gitler LLC

(57) ABSTRACT

A system for measuring roughness of a core sidewall of an optical waveguide based on mode excitation is provided, in which an optical waveguide to be measured is arranged between a few-mode long-period fiber grating and an optical power meter; the laser beam is incident on the optical waveguide to be measured after passing through the few-mode long-period fiber grating, and then is incident on the optical power meter after being subjected to a scattering loss caused by the roughness of the core sidewall of the optical waveguide to be measured; and the processor is configured to calculate an equivalent value of the roughness of the core sidewall according to the output power detected by the optical power meter, the output modes of the few-mode long-period fiber grating and the mode of the optical waveguide to be measured.

5 Claims, 4 Drawing Sheets

(56) References Cited

U.S. PATENT DOCUMENTS

| | | | |
|---|---|---|---|
| 2014/0254977 A1* | 9/2014 | Bock | G01D 5/35316 |
| | | | 385/12 |
| 2015/0369985 A1* | 12/2015 | Gruner-Nielsen | ...................... |
| | | | G02B 6/02314 |
| | | | 359/15 |
| 2021/0215927 A1* | 7/2021 | Swanson | G02B 23/26 |
| 2022/0260363 A1* | 8/2022 | Holmes | G01B 11/165 |

* cited by examiner

SYSTEM FOR MEASURING ROUGHNESS OF CORE SIDEWALL OF OPTICAL WAVEGUIDE BASED ON MODE EXCITATION

CROSS-REFERENCE TO RELATED APPLICATION

This patent application claims the benefit and priority of Chinese Patent Application No. 202410545698.9 filed with the China National Intellectual Property Administration on Apr. 30, 2024, the disclosure of which is incorporated by reference herein in its entirety as part of the present application.

TECHNICAL FIELD

The present disclosure relates to the technical field of backplane optical waveguide interconnection, in particular to a system for measuring roughness of a core sidewall of an optical waveguide based on mode excitation.

BACKGROUND

In recent years, an optical waveguide interconnection technology of an Optical Printed Circuit Board (OPCB) has attracted wide attention because of its unique advantages such as a high transmission rate, anti-electromagnetic interference, a high-density integration capability and low power consumption.

At present, optical waveguide materials can satisfy the demand of technical application. However, due to the limitation of an optical waveguide lithography preparation process, the roughness of the core sidewall is large, which not only leads to the coupling between guided modes, but also leads to the coupling between guided modes and radiation modes, thus resulting in a greater transmission loss, further limiting the wide application of an optical waveguide device. Therefore, it is very important to determine the roughness value of the core sidewall, which guides the structural optimization design of the optical waveguide. Roughness is usually measured by an Atomic Force Microscope (AFM) and a 3D optical profilometer. However, the measuring length is limited to tens of microns or several microns, which is not enough to reveal the overall view of the roughness of the core sidewall. It will take a lot of time to measure the overall view on the side of the core of the optical waveguide. Moreover, due to the special position of the core sidewall of the optical waveguide, the measurement difficulty will also increase. In addition, because the measurement is carried out after the preparation of the core of the optical waveguide, it is easy to be polluted by dust in the air, which will result in a greater scattering loss.

SUMMARY

The present disclosure aims to provide a system for measuring roughness of a core sidewall of an optical waveguide based on mode excitation, which can measure the roughness of the core sidewall of the optical waveguide more accurately.

In order to achieve the above objectives, the present disclosure provides the following solution.

The present disclosure relates to a system for measuring roughness of a core sidewall of an optical waveguide based on mode excitation, where the measurement system includes a few-mode long-period fiber grating, an optical power meter and a processor;

where an optical waveguide to be measured is arranged between the few-mode long-period fiber grating and the optical power meter; and a center line of the optical waveguide to be measured coincides with a center line of the few-mode long-period fiber grating; and the laser beam is incident on the optical waveguide to be measured after passing through the few-mode long-period fiber grating, and then is incident on the optical power meter after being subjected to a scattering loss caused by the roughness of the core sidewall of the optical waveguide to be measured; and the optical power meter detects the output power of the optical waveguide to be measured; and the processor is connected with the optical power meter; and the processor is configured to calculate an equivalent value of the roughness of the core sidewall of the optical waveguide to be measured according to the output power, the output modes of the corresponding few-mode long-period fiber grating and the modes of the optical waveguide to be measured; where the modes of the optical waveguide to be measured are obtained by exciting the optical waveguide to be measured after the laser beam passes through the few-mode long-period fiber grating.

In some embodiments, the few-mode long-period fiber grating includes a first few-mode long-period fiber grating and a second few-mode long-period fiber grating.

In some embodiments, optical fiber structures of the first few-mode long-period fiber grating and the second few-mode long-period fiber grating are the same.

In some embodiments, grating periods of the first few-mode long-period fiber grating and the second few-mode long-period fiber grating are different.

In some embodiments, the output modes of the few-mode long-period fiber grating include a first output mode and a second output mode; and the first few-mode long-period fiber grating corresponds to the first output mode, and the second few-mode long-period fiber grating corresponds to the second output mode.

In some embodiments, the laser beam is incident on the optical waveguide to be measured after passing through the first few-mode long-period fiber grating, and then is incident on the optical power meter after being subjected to the scattering loss caused by the roughness of the core sidewall of the optical waveguide to be measured; and the optical power meter detects the first output power of the optical waveguide to be measured;

the laser beam is incident on the optical waveguide to be measured after passing through the second few-mode long-period fiber grating, and then is incident on the optical power meter after being subjected to the scattering loss caused by the roughness of the core sidewall of the optical waveguide to be measured; and the optical power meter detects the second output power of the optical waveguide to be measured; and the processor is connected with the optical power meter; and the processor is configured to calculate an equivalent value of the roughness of the core sidewall of the optical waveguide to be measured according to the first output power, the second output power, the first output mode, the second output mode and the modes of the optical waveguide to be measured.

In some embodiments, the optical waveguide to be measured is a rectangular optical waveguide.

In some embodiments, one end of the optical waveguide to be measured is close to the few-mode long-period fiber grating; and another end of the optical waveguide to be measured is close to the optical power meter.

According to the specific embodiment provided by the present disclosure, the present disclosure provides the following technical effects.

According to the present disclosure, different modes excited by the few-mode long-period fiber grating are used to excite the modes in the multimode optical waveguide. Because the few-mode long-period fiber grating outputs different modes, the energy coefficients of the excited modes of the optical waveguide are also different. Furthermore, the light energy is detected by the optical power meter after being transmitted through the optical waveguide. Due to the influence of the core roughness, the transmission losses of the optical waveguide excited by the two modes are also different. Through the transmission loss difference between the two modes, the roughness of the core sidewall of the optical waveguide can be evaluated, and the roughness of the core sidewall of the optical waveguide can be measured more accurately.

BRIEF DESCRIPTION OF THE DRAWINGS

In order to explain the embodiments of the present disclosure or the technical solutions in the prior art more clearly, the drawings that need to be used in the embodiments will be briefly introduced. Obviously, the drawings in the following description are only some embodiments of the present disclosure. For those skilled in the art, other drawings can be obtained according to these drawings without creative labor.

mode of an optical waveguide.

Figure 2A:
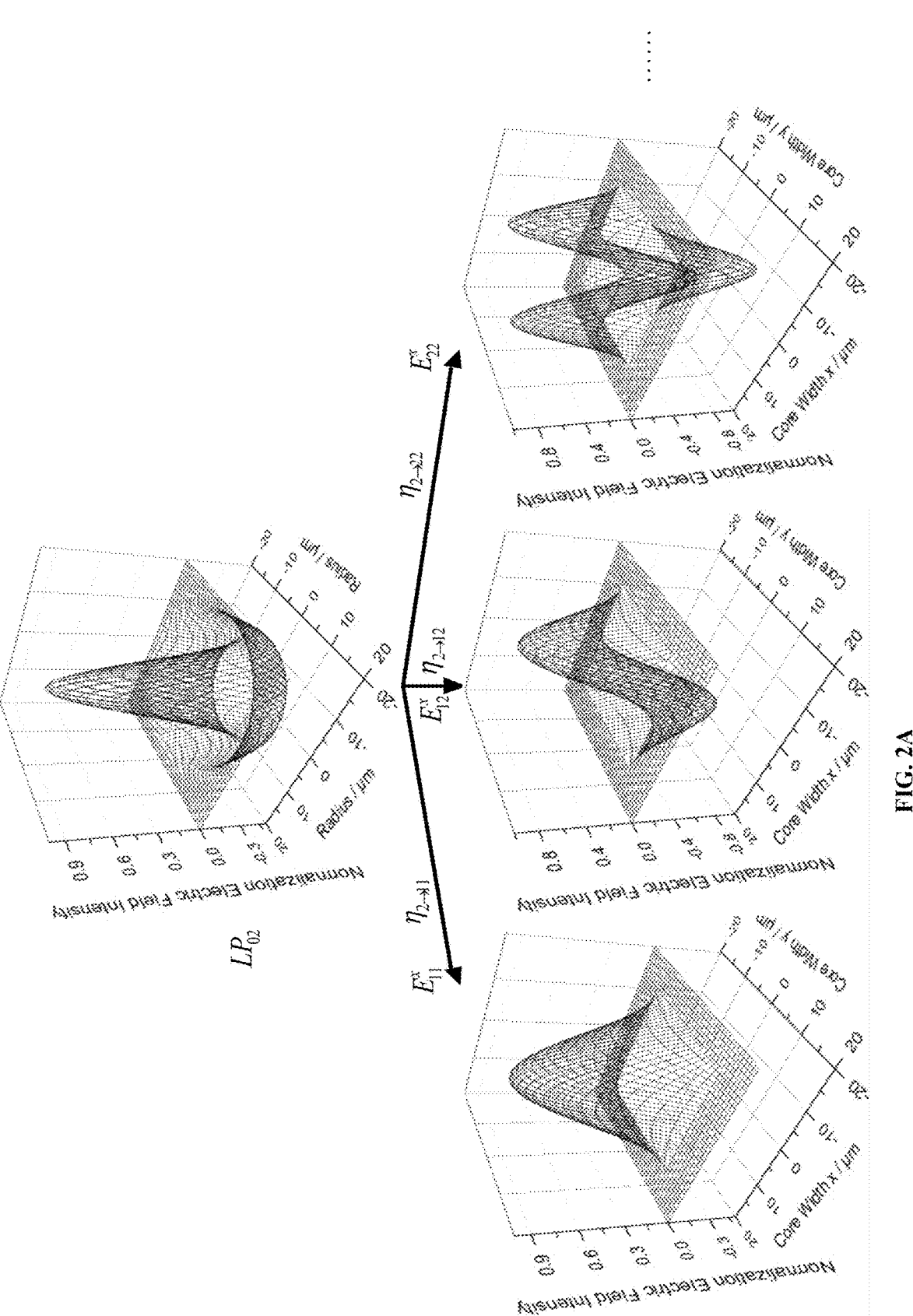
FIG. 2A is a schematic diagram of a few-mode long-period fiber grating outputting an $LP_{02}$ mode to excite an $$E_{mn}^x$$
Figure 2B:
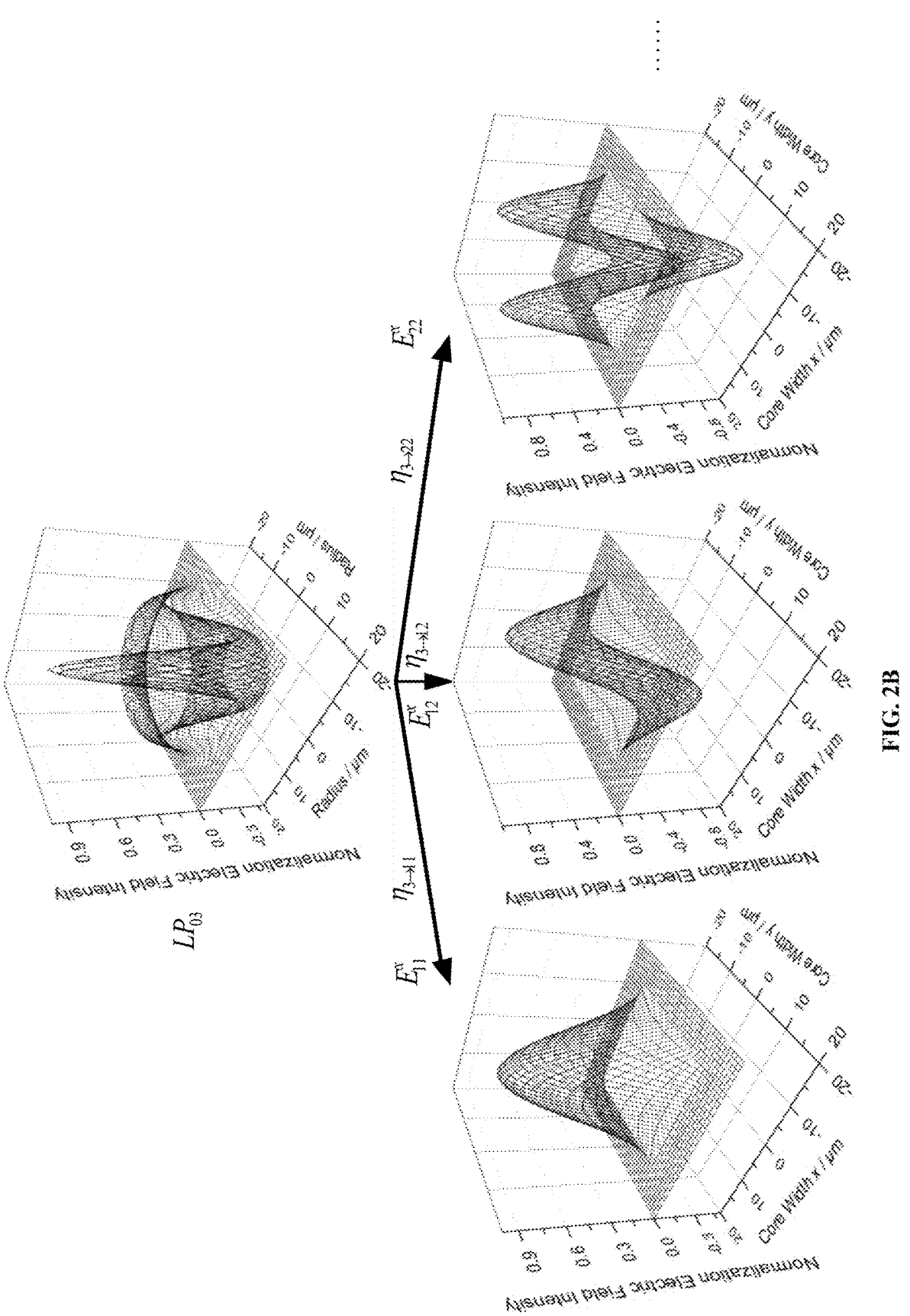

FIG. 2B is a schematic diagram of a few-mode long-period fiber grating outputting an $LP_{03}$ mode to excite an $$E_{mn}^x$$

mode of an optical waveguide.

Figure 3:
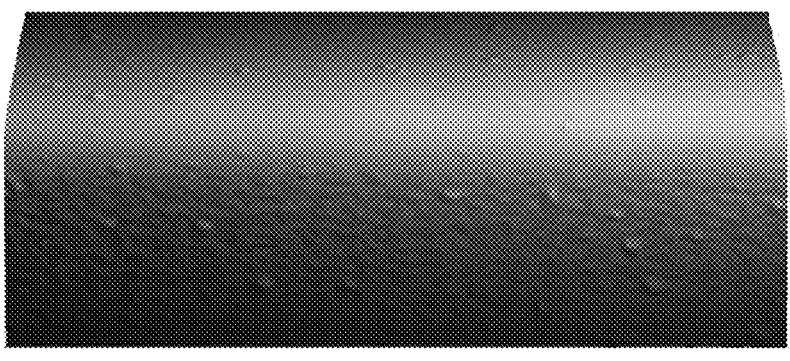

FIG. 3 is a picture of a core sidewall of an optical waveguide.

Figure 4:
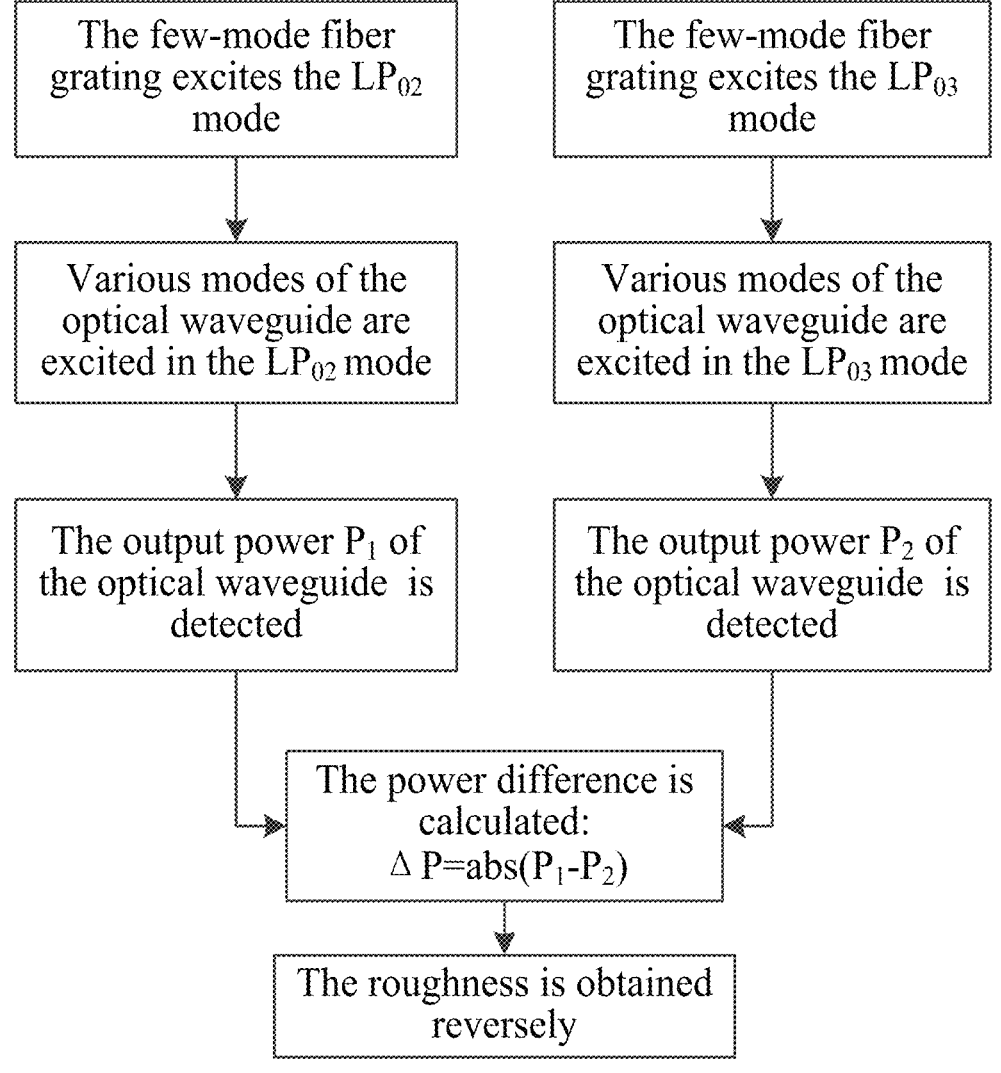

FIG. 4 is a flow chart of calculating roughness of a core sidewall based on a transmission loss difference of an optical waveguide.

DESCRIPTION OF REFERENCE NUMERALS

Few-mode long-period fiber grating—1, grating—2, optical waveguide to be measured—3, and optical power meter—4.

DETAILED DESCRIPTION OF THE EMBODIMENTS

The technical solutions in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiment of the present disclosure, all other embodiments obtained by those skilled in the art without creative labor fall within the scope of protection of the present disclosure.

The present disclosure aims to provide a system of measuring roughness of a core sidewall of an optical waveguide based on mode excitation, aiming at measuring the roughness of the core sidewall of the optical waveguide more accurately.

The present disclosure includes two few-mode long-period fiber gratings with different grating periods, an optical waveguide to be measured and an optical power meter. In some embodiments, the present disclosure consists of two few-mode long-period fiber gratings with different grating periods, an optical waveguide to be measured and an optical power meter. The two few-mode long-period fiber gratings can output different modes, and then a series of modes of the optical waveguide are excited by these two output modes. Under the two excitation conditions, the types of the modes are the same, but the energy coefficients of the modes are different. After a series of modes carrying light with a certain proportion of energy passing through the optical waveguide, the light is detected by the optical power meter. The transmission powers of the optical waveguide are different under the two excitation conditions due to the influence of the roughness of the core sidewall. Based on the transmission power difference between the two conditions (that is, the scattering loss difference resulted from the roughness of the sidewall of the optical waveguide), the roughness of the core sidewall of the optical waveguide is calculated reversely.

In order to make the above objects, features and advantages of the present disclosure more obvious and understandable, the present disclosure will be explained in further detail with reference to the drawings and detailed description hereinafter.

Embodiment 1

Figure 1:
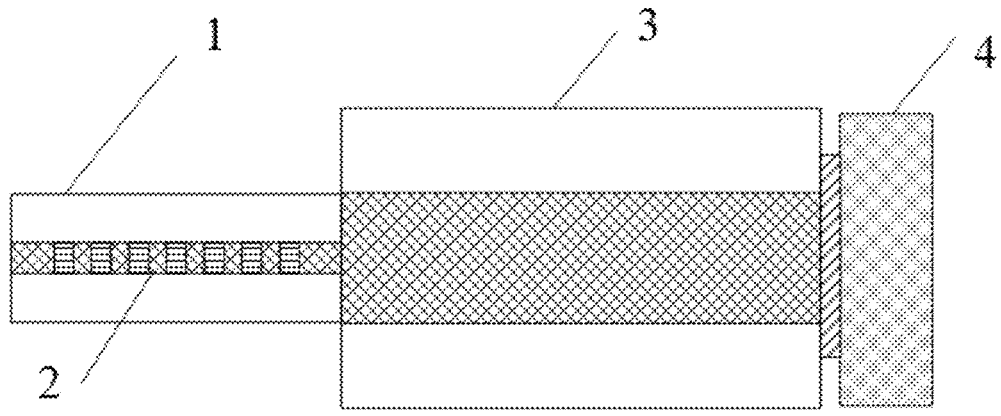
FIG. 1 is a schematic diagram of a system architecture for implementing a method for measuring roughness of a core sidewall of an optical waveguide based on mode excitation according to the present disclosure.

As shown in FIG. 1, a system for measuring roughness of a core sidewall of an optical waveguide based on mode excitation in this embodiment includes a few-mode long-period fiber grating 1, an optical power meter 4 and a processor.

An optical waveguide to be measured 3 is arranged between the few-mode long-period fiber grating 1 and the optical power meter 4; and a center line of the optical waveguide to be measured 3 coincides with a center line of the few-mode long-period fiber grating 1.

The laser beam is incident on the optical waveguide to be measured 3 after passing through the few-mode long-period fiber grating 1, and then is incident on the optical power meter 4 after being subjected to a scattering loss caused by the roughness of the core sidewall of the optical waveguide to be measured 3; and the optical power meter 4 detects the output power of the optical waveguide to be measured 3.

The processor is connected with the optical power meter 4; and the processor is configured to calculate an equivalent value of the roughness of the core sidewall of the optical waveguide to be measured 3 according to the output power, the output modes of the corresponding few-mode long-period fiber grating 1 and the modes of the optical waveguide to be measured; where the modes of the optical waveguide to be measured are obtained by exciting the optical waveguide to be measured after the laser beam passes through the few-mode long-period fiber grating.

The few-mode long-period fiber grating 1 includes a first few-mode long-period fiber grating and a second few-mode long-period fiber grating. Optical fiber structures of the first few-mode long-period fiber grating and the second few-mode long-period fiber grating are the same. The period of grating 2 in the first few-mode long-period fiber grating and the period of grating 2 in the second few-mode long-period fiber grating are different.

As a specific embodiment, the output modes of the few-mode long-period fiber grating 1 include a first output mode and a second output mode. The first few-mode long-period fiber grating corresponds to the first output mode, and the second few-mode long-period fiber grating corresponds to the second output mode.

Further, the laser beam is incident on the optical waveguide to be measured 3 after passing through the first few-mode long-period fiber grating, and then is incident on the optical power meter 4 after being subjected to the scattering loss caused by the roughness of the core sidewall of the optical waveguide to be measured 3; and the optical power meter 4 detects the first output power of the optical waveguide to be measured 3.

The laser beam is incident on the optical waveguide to be measured 3 after passing through the second few-mode long-period fiber grating, and then is incident on the optical power meter 4 after being subjected to the scattering loss caused by the roughness of the core sidewall of the optical waveguide to be measured 3; and the optical power meter 4 detects the second output power of the optical waveguide to be measured 3.

The processor is connected with the optical power meter 4; and the processor is configured to calculate an equivalent value of the roughness of the core sidewall of the optical waveguide to be measured 3 according to the first output power, the second output power, the first output mode, the second output mode and the modes of the optical waveguide to be measured.

As a specific embodiment, the optical waveguide to be measured 3 is a rectangular optical waveguide.

As a specific embodiment, one end of the optical waveguide to be measured 3 is close to the few-mode long-period fiber grating 1, and another end of the optical waveguide to be measured 3 is close to the optical power meter 4.

As shown in FIG. 1, the present disclosure mainly consists of a few-mode long-period fiber grating 1, an optical waveguide to be measured 3 and an optical power meter 4. The center of the few-mode long-period fiber grating 1 is aligned with the multimode optical waveguide. The light energy output by the light after passing through the multimode optical waveguide is detected by the optical power meter 4.

As shown in FIGS. 2A-2B, the output modes of the few-mode long-period fiber grating 1 with different grating periods are different, and the energy coefficients of the optical waveguide mode excited at the center are also different. Therefore, the total transmission losses of the optical waveguide resulted from the roughness (as shown in FIG. 3) of the sidewall under the two conditions are also different, that is, the power values detected by the optical power meter are different.

According to the calculation flow shown in FIG. 4, the roughness of the core sidewall is calculated reversely according to the power value difference detected by the optical power meter. The calculation process specifically includes the following steps.

In step 1, the first few-mode long-period fiber grating excites the $LP_{02}$ mode, and the second few-mode long-period fiber grating excites the $LP_{03}$ mode.

In step 2, various modes of the optical waveguide to be measured are excited in the $LP_{02}$ mode, and various modes of the optical waveguide to be measured are excited in the $LP_{03}$ mode.

In step 3, the output power $P_1$ in the $LP_{02}$ mode and the output power $P_2$ in the $LP_{03}$ mode are detected.

In step 4, the power difference is calculated: $\Delta P = abs(P_1 - P_2)$.

In step 5, according to the power difference, the roughness is obtained reversely.

In practical application, the optical fiber structures of the two few-mode long-period fiber gratings are exactly the same, but the grating periods thereof are different, which can excite different output modes. The optical waveguide to be measured has a multimode structure, which can be completely coupled the energy of the output mode of the few-mode long-period fiber grating. The types of the modes are the same under the two excitation conditions, but the energy coefficients of the modes are different. When light is transmitted in the optical waveguide, the mode of the optical waveguide is affected by the roughness of the core sidewall, resulting in a scattering loss. Because the scattering losses of different modes of the optical waveguide affected by the roughness of the core sidewall are different and the energy coefficients of the modes under two excitation conditions are different, the output powers of the optical waveguide detected by the optical power meter are also different. According to the detected output power difference of the optical waveguide (that is, the scattering loss difference resulted from the roughness of the sidewall of the optical waveguide), the roughness of the core sidewall of the optical waveguide is calculated reversely.

According to the present disclosure, the technical principle of calculating the roughness of the core sidewall of the optical waveguide reversely is as follows:

The few-mode long-period fiber grating can excite the $LP_{0i}$ ($i=1, 2, 3 \ldots$) mode of the multimode optical waveguide. When the few-mode long-period fiber grating is aligned with the central axis of the optical waveguide, the $$E_{mn}^x$$

mode of the multimode optical waveguide can be excited by the $LP_{0i}$ mode. The proportion of energy carried by the $$E_{mn}^x$$

mode can be obtained by superposition and integration of the field $\psi_{mn}(x,y)$ of the $$E_{mn}^x$$

7 mode and the field $\psi_i(x,y)$ of the $LP_{0i}$ mode of a single-mode fiber:

$$\eta_{i \rightarrow mn} = \frac{\left| \int_{-\infty}^{\infty} \int_{-\infty}^{\infty} \psi_i(x, y) \psi_{mn}(x, y) dx dy \right|^2}{\int_{-\infty}^{\infty} \int_{-\infty}^{\infty} |\psi_i(x, y)|^2 dx dy \int_{-\infty}^{\infty} \int_{-\infty}^{\infty} |\psi_{mn}(x, y)|^2 dx dy} \quad (1)$$

where x and y are the two-dimensional coordinates of the section of the optical waveguide, and $n_{i \rightarrow mn}$ is the energy proportional coefficient obtained by exciting the $$E_{mn}^x$$

mode of the optical waveguide by the $LP_{0i}$ mode.
Considering all the $$E_{mn}^x$$

modes in the rectangular optical waveguide, the total coupling efficiency of the single-mode fiber and the optical waveguide is denoted as:

$$\eta_{i \rightarrow w} = \sum_{m=1}^{M} \sum_{n=1}^{N} |\eta_{i \rightarrow mn}| \quad (2)$$

where M and N are the maximum values of the mode ordinal numbers m and n in the optical waveguide, respectively; $n_{i \rightarrow w}$ is the total coupling efficiency of the single-mode fiber and the optical waveguide, w represents the optical waveguide.

In the rectangular optical waveguide, when the optical transmission distance is L, the mode transmission field becomes $\psi_{mn}(x,y)\exp(-\alpha_{mn}L)$, and $\alpha_{mn}$ is the scattering loss coefficient of the optical waveguide mode resulted from roughness. Considering all the mode losses, for the central symmetric coupling structure of the few-mode fiber grating and the optical waveguide, the total scattering loss at the output end of the optical waveguide can be expressed as:

$$Loss^{(s)} = -10\log_{10}\left\{ \sum_{m=1}^{M} \sum_{n=1}^{N} |\eta_{i \rightarrow mn} \exp(-\alpha_{mn}L)| / \sum_{m=1}^{M} \sum_{n=1}^{N} |\eta_{i \rightarrow mn}| \right\} \quad (3)$$

where $Loss^{(s)}$ is the total scattering loss at the output end of the optical waveguide.

In an optical waveguide, the scattering loss of optical transmission is a function of the core interface roughness $\sigma$, the mode propagation constant $\beta_{mn}$, the waveguide length L and the mode coupling efficiency $\eta$ of the optical waveguide. Assuming that the scattering loss deviation $\delta$ of the two coupling structures is known, the core interface roughness can be obtained by the following formula:

$$\delta = Loss^{(m)}\left( \sum_{m}^{M} \sum_{n}^{M} \beta_{mn}, L, \sigma \right) - Loss^{(s)}\left( \sum_{m}^{M} \sum_{n}^{M} \beta_{mn}, L, \sigma \right) \quad (4)$$

8

-continued
where $$Loss^{(m)}\left( \sum_{m}^{M} \sum_{n}^{M} \beta_{mn}, L, \sigma \right)$$

and $$Loss^{(s)}\left( \sum_{m}^{M} \sum_{n}^{M} \beta_{mn}, L, \sigma \right)$$

are the expressions of the total scattering loss of the light energy after the multimode optical waveguide is excited by two modes output by the few-mode fiber grating, respectively. After the parameters ($\beta_{mn}$, L, $n_{i \rightarrow w}$) are determined, $\sigma$ can be solved by numerical programming. For the convenience of calculation, the formula (4) can be written as:

$$f(\sigma) = \delta - \left[ Loss^{(m)}\left( \sum_{m}^{M} \sum_{n}^{M} \beta_{mn}, L, \sigma \right) - Loss^{(s)}\left( \sum_{m}^{M} \sum_{n}^{M} \beta_{mn}, L, \sigma \right) \right] \quad (5)$$

where $f(\sigma)$ is only an equation symbol, which is used to solve the $\sigma$ value when $f(\sigma)$ is 0.

The trial solution of $\sigma$ is substituted into the formula (5). When $f(\sigma)$ is 0, the $\sigma$ value is its solution at this time, and the roughness value can be obtained.

Taking the reverse calculation of the roughness of the core sidewall by the specific parameter values as an example, the present disclosure will be explained in detail.

When the grating period is $L_1$, the output mode of the few-mode long-period fiber grating is $LP_{02}$, and the energy coefficient excited by the optical waveguide mode is shown in Table 1.

TABLE 1

| Energy coefficients of various modes of the optical waveguide excited by $LP_{02}$ | | | | | | | |
|---|---|---|---|---|---|---|---|
| $E_{11}^x$ | $E_{12}^x$ | $E_{21}^x$ | $E_{22}^x$ | $E_{13}^x$ | $E_{31}^x$ | $E_{23}^x$ | . . . |
| 0.146 | 0 | 0 | 0 | 0.101 | 0.099 | 0 | . . . |

In this case, it is assumed that the transmission power of the optical waveguide is $P_1=1$ dBm.

When the grating period is $L_2$, the output mode of the few-mode long-period fiber grating is $LP_{03}$, and the energy coefficient excited by the optical waveguide mode is shown in Table 2.

TABLE 2

| Energy coefficients of various modes of the optical waveguide excited by $LP_{03}$ | | | | | | | |
|---|---|---|---|---|---|---|---|
| $E_{11}^x$ | $E_{12}^x$ | $E_{21}^x$ | $E_{22}^x$ | $E_{13}^x$ | $E_{31}^x$ | $E_{23}^x$ | . . . |
| 0.151 | 0 | 0 | 0 | 0.103 | 0.100 | 0 | . . . |

In this case, it is assumed that the transmission power of the optical waveguide is $P_2=1.1$ dBm.

It can be seen that under the excitation of the two output modes of the few-mode long-period fiber grating, the scattering loss difference resulted from the roughness of the sidewall of the optical waveguide is abs($P_1-P_2$)=0.1 dB, and the roughness of the core sidewall is calculated as 195.6 nm reversely. In the reverse calculation, the core diameter of the few-mode fiber is 8 μm; the length of the optical waveguide is 10 cm. At the wavelength of 850 nm, the refractive indices of materials of the core and the cladding are 1.51 and 1.48, respectively. The cross-sectional width of the core of the optical waveguide is 50 μm, and the height is 50 μm.

Compared with the prior art, the present disclosure has the following beneficial effects.

(1) Roughness is usually measured by an Atomic Force Microscope (AFM) and a 3D optical profilometer. However, the measuring length is limited to tens of microns or several microns, which is not enough to reveal the overall view of the roughness of the core sidewall. It will take a lot of time to measure the overall view on the side of the core of the optical waveguide. Moreover, due to the special position of the core sidewall of the optical waveguide, the measurement difficulty will also increase. The present disclosure does not need a professional device for measurement, and only needs to obtain the transmission loss difference of the optical waveguide under the excitation of the two modes, so that the roughness of the side wall of the optical waveguide can be reversely deduced. Moreover, the roughness reflects the overall view of the roughness of the side wall of the entire optical waveguide. The present disclosure has the outstanding characteristics of a simple measurement manner and less test time.

(2) Because the measurement is carried out after the preparation of the core of the optical waveguide, it is easy to be polluted by dust in the air, which will result in a greater scattering loss. The present disclosure is carried out after the optical waveguide is coated with the cladding, so that the core avoids air pollution and reduces the scattering loss of the optical waveguide.

The technical features of the above embodiments can be combined at will. In order to make the description concise, not all possible combinations of the technical features in the above embodiments are described. However, as long as there is no contradiction between the combinations of these technical features, the combinations should be considered as the scope described in this specification.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. A system for measuring roughness of a core sidewall of an optical waveguide based on mode excitation, comprising:
a few-mode long-period fiber grating,
an optical power meter, and
a processor; wherein
an optical waveguide to be measured is arranged between the few-mode long-period fiber grating and the optical power meter; and a center line of the optical waveguide to be measured coincides with a center line of the few-mode long-period fiber grating;
a laser beam is incident on the optical waveguide to be measured after passing through the few-mode long-period fiber grating, and then is incident on the optical power meter after being subjected to a scattering loss caused by the roughness of the core sidewall of the optical waveguide to be measured; and the optical power meter detects output power of the optical waveguide to be measured; and the processor is connected with the optical power meter; and the processor is configured to calculate an equivalent value of the roughness of the core sidewall of the optical waveguide to be measured according to the output power, output modes of a corresponding few-mode long-period fiber grating and modes of the optical waveguide to be measured; wherein the modes of the optical waveguide to be measured are obtained by exciting the optical waveguide to be measured after the laser beam passes through the few-mode long-period fiber grating;

wherein the few-mode long-period fiber grating comprises a first few-mode long-period fiber grating and a second few-mode long-period fiber grating;

wherein the output modes of the few-mode long-period fiber grating comprise a first output mode and a second output mode; and wherein the first few-mode long-period fiber grating corresponds to the first output mode, and the second few-mode long-period fiber grating corresponds to the second output mode;

wherein the laser beam is incident on the optical waveguide to be measured after passing through the first few-mode long-period fiber grating, and then is incident on the optical power meter after being subjected to the scattering loss caused by the roughness of the core sidewall of the optical waveguide to be measured; and the optical power meter detects first output power of the optical waveguide to be measured;

wherein the laser beam is incident on the optical waveguide to be measured after passing through the second few-mode long-period fiber grating, and then is incident on the optical power meter after being subjected to the scattering loss caused by the roughness of the core sidewall of the optical waveguide to be measured; and the optical power meter detects second output power of the optical waveguide to be measured; and wherein the processor is connected with the optical power meter; and the processor is configured to calculate the equivalent value of the roughness of the core sidewall of the optical waveguide to be measured according to the first output power, the second output power, the first output mode, the second output mode and the modes of the optical waveguide to be measured.

2. The system according to claim 1, wherein optical fiber structures of the first few-mode long-period fiber grating and the second few-mode long-period fiber grating are same.

3. The system according to claim 2, wherein grating periods of the first few-mode long-period fiber grating and the second few-mode long-period fiber grating are different.

4. The system according to claim 1, wherein the optical waveguide to be measured is a rectangular optical waveguide.

5. The system according to claim 1, wherein one end of the optical waveguide to be measured is close to the few-mode long-period fiber grating; and another end of the optical waveguide to be measured is close to the optical power meter.

* * * * *